United States Patent
Lee et al.

[11] Patent Number: 5,967,752
[45] Date of Patent: Oct. 19, 1999

[54] SLANT-TIER TURBINE AIRFOIL

[75] Inventors: Ching-Pang Lee, Cincinnati; George A. Durgin, West Chester; Robert W. Harris, Hamilton, all of Ohio

[73] Assignee: General Electric Company, Cincinnati, Ohio

[21] Appl. No.: 09/001,659

[22] Filed: Dec. 31, 1997

[51] Int. Cl.⁶ .............................. B65H 1/14; F01D 5/08
[52] U.S. Cl. ........................................................ 416/97 R
[58] Field of Search ................... 416/95, 96 R, 416/97 R; 415/115

[56] References Cited

U.S. PATENT DOCUMENTS

| | | | |
|---|---|---|---|
| 2,744,723 | 5/1956 | Roush | 416/96 R |
| 3,849,025 | 11/1974 | Grondahl | 416/97 R |
| 4,180,373 | 12/1979 | Moore et al. | 416/97 R |
| 4,416,585 | 11/1983 | Abdel-Messeh | 416/97 R |
| 4,474,532 | 10/1984 | Pazder | 416/97 R |
| 4,514,144 | 4/1985 | Lee | 416/96 R |
| 4,515,526 | 5/1985 | Levengood | 416/96 R |
| 4,775,296 | 10/1988 | Schwarzmann et al. | 416/97 R |
| 5,052,889 | 10/1991 | Abdel-Messeh | 416/97 R |
| 5,395,212 | 3/1995 | Anzai et al. | 416/97 R |
| 5,403,157 | 4/1995 | Moore | 416/97 R X |
| 5,591,007 | 1/1997 | Lee et al. | |
| 5,611,662 | 3/1997 | Cunha | 415/115 |
| 5,681,144 | 10/1997 | Spring et al. | 416/97 R |
| 5,842,829 | 12/1998 | Cunha et al. | 415/115 |

FOREIGN PATENT DOCUMENTS

| | | | |
|---|---|---|---|
| 779590 | 11/1980 | Russian Federation | 416/97 R |
| 679931 | 9/1952 | United Kingdom | 416/97 R |

*Primary Examiner*—John Ryznic
*Attorney, Agent, or Firm*—Andrew C. Hess; Rodney M. Young

[57] ABSTRACT

A turbine airfoil includes a plurality of internal ribs joined to laterally opposite first and second sidewalls to define a serpentine cooling circuit therein. A span rib extends longitudinally between a root and tip of the airfoil. And, a slant rib extends obliquely to the span rib to define respective portions of the serpentine circuit longitudinally above and below the slant rib.

20 Claims, 5 Drawing Sheets

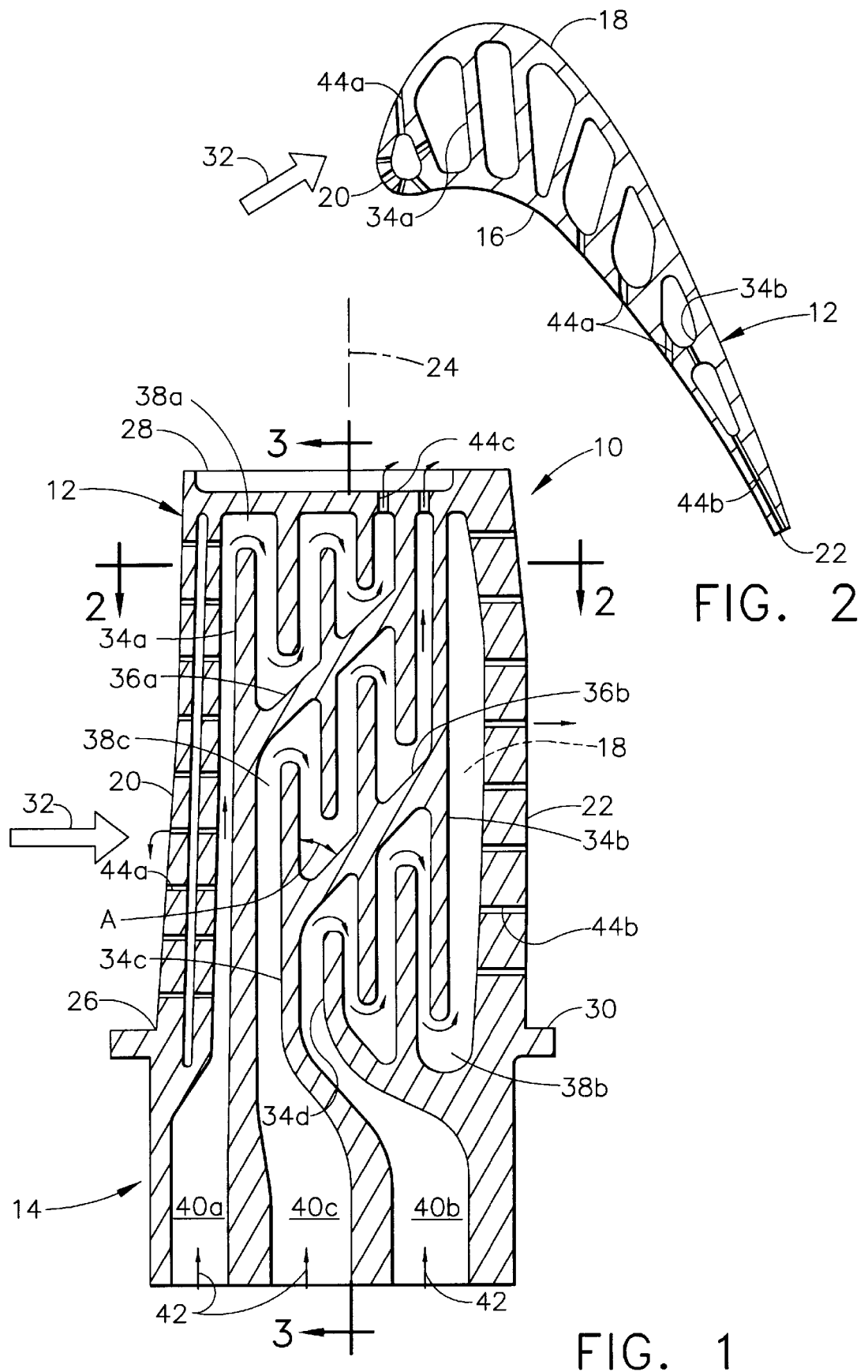

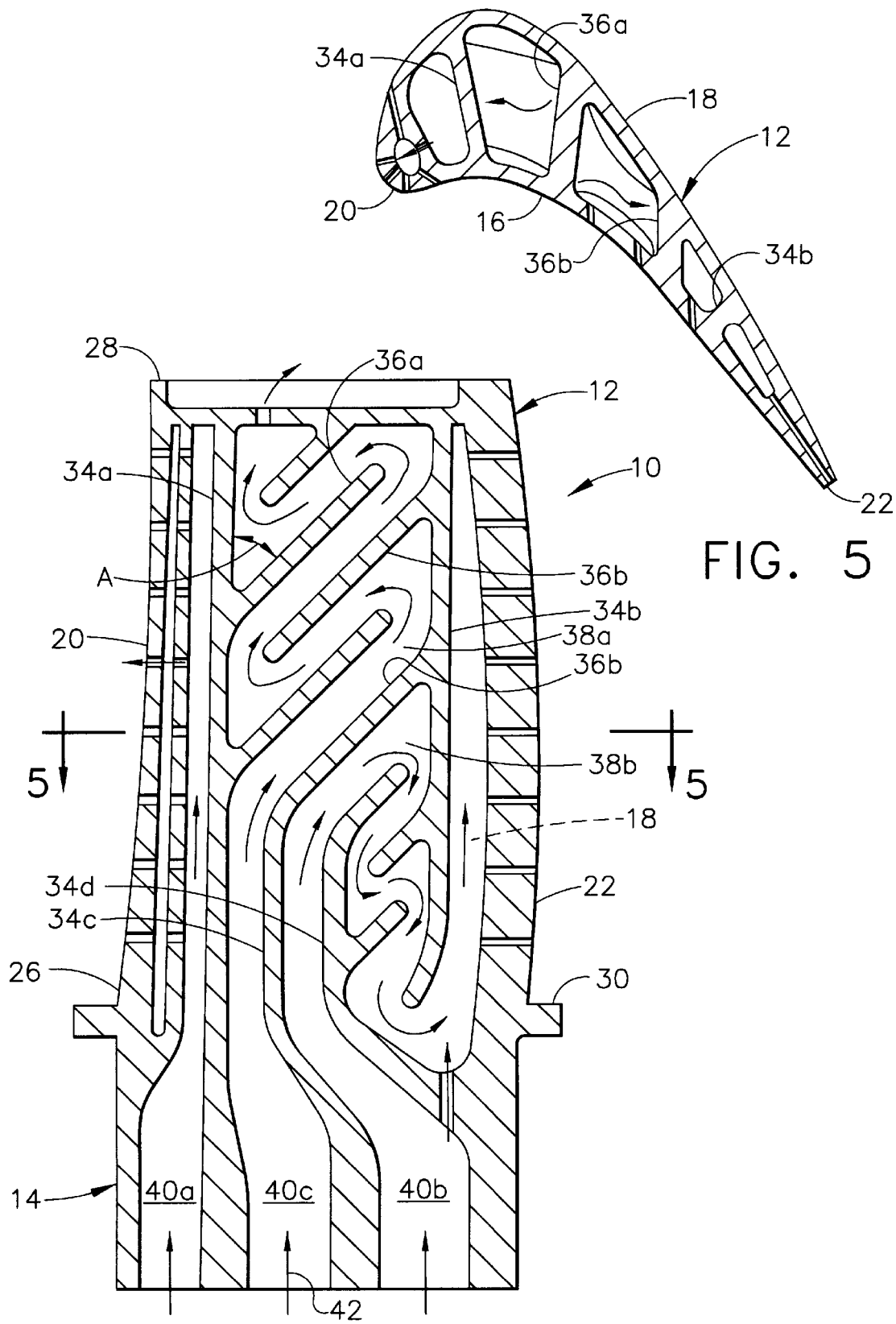

SLANT-TIER TURBINE AIRFOIL

BACKGROUND OF THE INVENTION

The present invention relates generally to gas turbine engines, and, more specifically, to cooling of turbine rotor blades and stator vanes therein.

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example.

A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk.

Since the combustion gases are hot, the turbine vanes and blades are typically cooled with a portion of compressor air bled from the compressor for this purpose. Diverting any portion of the compressor air from use in the combustor necessarily decreases the overall efficiency of the engine.

Accordingly, it is desired to cool the vanes and blades with as little compressor bleed air as possible.

Turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness, and the cooling air is discharged from the passages through various film cooling holes disposed around the outer surface of the airfoil.

The airfoil outer surface is defined by a generally concave pressure side and an opposite, generally convex suction side which extend radially between a root and a tip of the airfoil and axially between leading and trailing edges thereof. The temperature profiles of the combustion gases channeled over the airfoil vary significantly over the pressure and suction sides. This in turn affects both the cooling requirements over the airfoil and cooling effectiveness. Greater cooling is desired where heat input is greatest, and backflow margin and blowing ratio must be controlled across the film cooling holes. Film cooling holes should have suitable blowing ratios to most effectively produce a protecting layer of film cooling air over the blade surface without flow separation and with suitable backflow margin.

In U.S. Pat. No. 5,591,007-Lee et al, a multi-tier turbine airfoil is disclosed and claimed for improving cooling performance of internal serpentine cooling passages therein. By arranging two or more serpentine passages in independent circuits radially over the airfoil span, cooling air may be directly channeled to the mid-span portion of the airfoil having the greatest heat input from the combustion gases. Since the cooling air in each serpentine circuit increases in temperature as it cools the airfoil, the multi-tier serpentine circuits target the cooling air to specific regions of the airfoil for enhancing cooling thereof over conventional radial serpentine circuits extending completely between the root and tip of the airfoil.

However, in order to effect the multi-tier serpentine circuit, radially extending span ribs must necessarily be interrupted for providing a separating tier rib extending axially. Since a turbine rotor blade experiences substantial centrifugal force during operation, the interruption in the span rib interrupts the loadpath for carrying airfoil centrifugal loads to the dovetail and in turn to the rotor disk supporting the airfoil.

The centrifugal loads must then be carried solely through respective portions of the airfoil pressure and suction sides bypassing the span interruption which results in local stress concentration that affects the useful life of the airfoil. Furthermore, an axially extending tier partition rib effectively introduces mere dead weight without significant load support, and the centrifugal loads therefrom must also be carried by the adjacent portions of the airfoil.

Accordingly, although the multi-tier turbine airfoil provides improvement in cooling thereof, it also changes the load carrying structure of the airfoil for both centrifugal forces, as well as vibratory response. It is therefore desired to further improve the multi-tier turbine airfoil both in load carrying capability and cooling effectiveness.

SUMMARY OF THE INVENTION

A turbine airfoil includes a plurality of internal ribs joined to laterally opposite first and second sidewalls to define a serpentine cooling circuit therein. A span rib extends longitudinally between a root and tip of the airfoil. And, a slant rib extends obliquely to the span rib to define respective portions of the serpentine circuit longitudinally above and below the slant rib.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 1 is an axial sectional view of an exemplary gas turbine engine turbine blade having an airfoil including slant-tier serpentine cooling circuits therein.

FIG. 2 is a lateral sectional view through the blade airfoil illustrated in FIG. 1 and taken along line 2—2.

FIG. 4 is an axial sectional view of a turbine blade having an airfoil including a slant-tier serpentine cooling circuit in accordance with a second embodiment of the present invention.

FIG. 5 is a lateral sectional view through the blade airfoil illustrated in FIG. 4 and taken along line 5—5.

DESCRIPTION OF THE PREFERRED EMBODIMENT(S)

Figure 3:
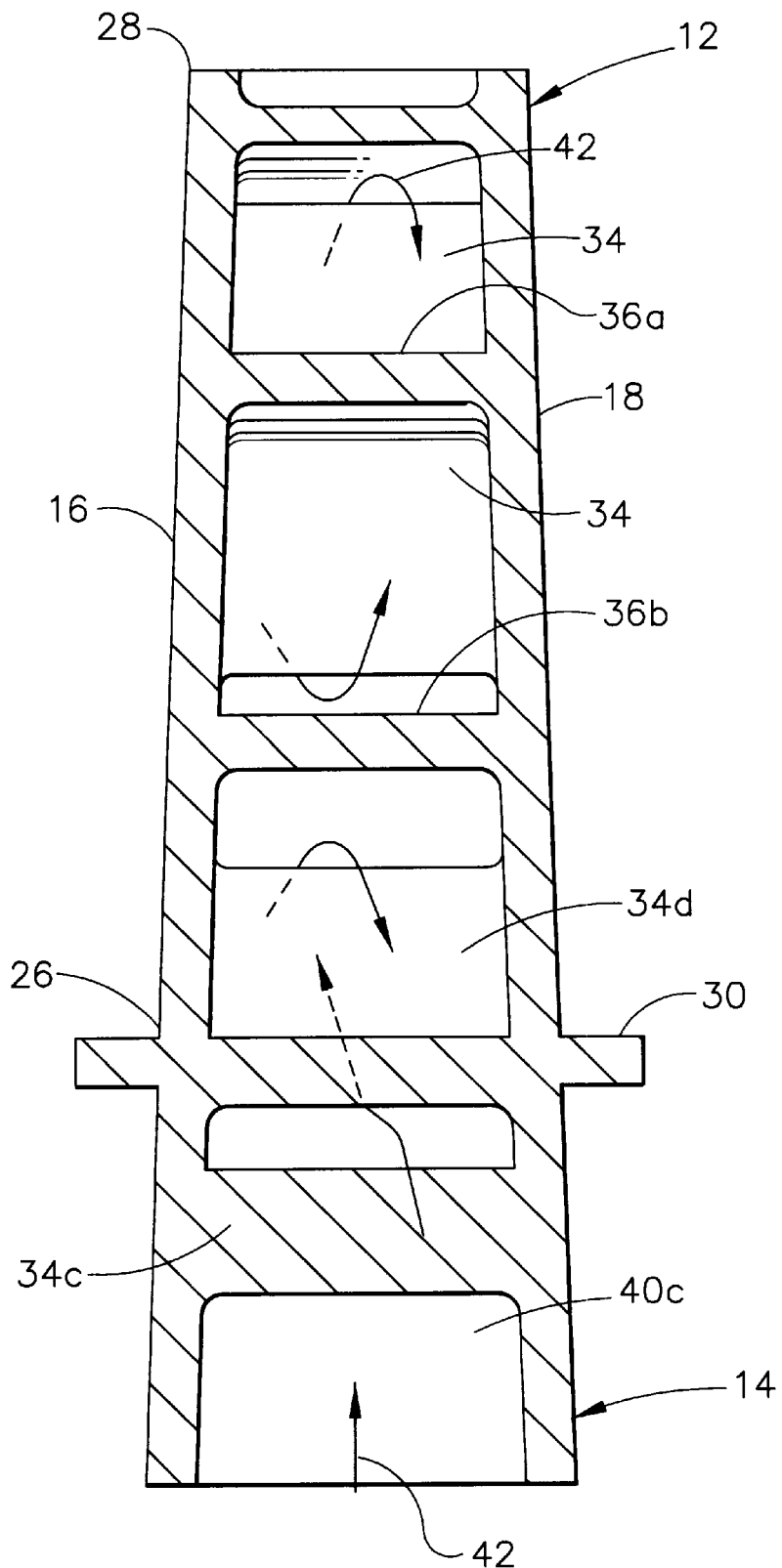
FIG. 3 is a radial elevational sectional view through the blade airfoil illustrated in FIG. 1 and taken a long line 3—3.

Illustrated in FIG. 1 is an exemplary turbine rotor blade 10 for a gas turbine engine. The blade 10 includes an airfoil 12 and a conventional dovetail 14 which is used to conventionally secure the blade 10 to a rotor disk (not shown) of the engine. A cross-section of the airfoil 12 is illustrated in FIG. 2 and shows a first or pressure sidewall 16 and a second or suction sidewall 18 joined together along an upstream leading edge 20 and a downstream trailing edge 22 which is spaced axially or chordally therefrom.

As shown in FIG. 1, the airfoil 12 also extends longitudinally along a longitudinal or radial axis 24 in the direction of the span of the airfoil 12 from a radially inner root 26 to a radially outer tip 28. The root 26 is defined at a conventional platform 30 which forms the inner flow boundary of the airfoil 12 and below which extends the dovetail 14.

During operation of the blade 10, combustion gases 32 are generated by a combustor (not shown) and flow downstream over both airfoil sidewalls 16 and 18. The radial or longitudinal temperature profile of the combustion gases 32 typically is center-peaked near the mid-span region of the airfoil from about 50% to about 80% span thereof. Secondary flow fields between adjacent ones of the airfoils 12 may cause the temperature profile to shift radially outwardly over the airfoil pressure sidewall 16 radially outwardly over a range of about 70% to about 85% of the radial height or span of the airfoil 12. Accordingly, the pressure sidewall 16 experiences its greatest heat input or load above the mid-span region in the 70% to 85% span height.

In accordance with the present invention, preferential radial or spanwise cooling of the airfoil 12 is effected to better match the distribution of the heat load thereto from the combustion gases 32. Although an exemplary gas turbine rotor blade 10 is illustrated in the Figures, the invention applies equally as well to turbine stator vanes having similar airfoils which may be similarly cooled in accordance with the present invention.

More specifically, the first and second sidewalls 16, 18 are spaced circumferentially or laterally apart from each other between the leading and trailing edges 20,22 and are integrally joined together by a plurality of internal span and slant ribs indicated generally by their prefixes 34,36. The ribs define at least one, and preferably two or more independent serpentine cooling passages or circuits 38 arranged in part in differential longitudinal decks or tiers, with an outer serpentine tier circuit 38a being disposed in part longitudinally or radially above an inner serpentine tier circuit 38b for differentially longitudinally cooling the airfoil 12 to better match the applied heat loads from the combustion gases 32. In the exemplary embodiment illustrated in FIG. 1, a middle serpentine tier circuit 38c is disposed longitudinally between the outer and inner tiers in a three-tier configuration. Each of the three serpentine circuits 38a–c includes an independent radially extending inlet channel 40a–c, respectively, extending radially inwardly through the dovetail 14. Cooling air 42 is conventionally channeled to the inlets 40a–c from a compressor (not shown) to cool the airfoil. The multi-tier serpentine circuits 38a–c illustrated in FIG. 1 enjoy the cooling benefits disclosed in U.S. Pat. No. 5,591,007 and may be preferentially configured for locally cooling different portions of the airfoil for maximizing effectiveness and efficiency of the cooling air 42 bled from the compressor.

Since the multi-tier cooling circuits 38 are necessarily interrupted in the longitudinal span of the airfoil 12, they correspondingly locally interrupt the load carrying capability of the airfoil. When the blade 10 is rotated atop the disk during operation, substantial centrifugal force is generated in the airfoil which increases in magnitude from the tip to the root of the airfoil, with the entire centrifugal force generated by the rotating blade being transferred by the dovetail 14 into the rotor disk. The centrifugal loads carried by the different portions of the airfoil create centrifugal stress therein which is inversely proportional to the effective load carrying cross-sectional area thereof. The centrifugal force is carried in part by the continuous first and second sidewalls 16, 18, and by cooperating internal ribs therein.

As shown in FIG. 3, the radially extending span ribs 34 provide integral bridges between the first and second sidewalls 16,18 and provide additional cross-sectional area for carrying the centrifugal loads with reduced stress. In accordance with a significant feature of the present invention as illustrated in FIG. 1, the slant ribs 36 extend generally along the chord of the airfoil but are slanted obliquely to the corresponding span ribs 34 at an oblique slant angle A which is less than or greater than 90° depending upon the tilt orientation of the slant ribs 36.

Each slant rib is preferably straight and uniform in cross-section, and has a longitudinal centerline axis disposed at the slant angle A. The slant angle A is in the preferred range of 30° to 60° to maximize the centrifugal load bridging capability of the slant ribs while obtaining enhanced serpentine cooling effectiveness therewith.

The slant ribs 36 define respective portions of the serpentine circuits 38 longitudinally above and below the respective slant ribs 36 while also providing additional centrifugal load carrying capability in the airfoil in cooperation with the sidewalls 16,18. Orienting the slant ribs 36 normal to the span ribs 34 with an angle A of 90° is not preferred since this orientation merely provides additional dead weight which must be carried solely by the adjoining material. By tilting the slant ribs 36 over an extended longitudinal range, they provide additional structural support between the sidewalls 16,18 for improving the centrifugal load carrying capability of the airfoil 10.

In the FIG. 1 embodiment, a plurality of the span ribs 34 are spaced chordally apart, and a plurality of the slant ribs 36 are spaced longitudinally apart. The slant ribs 36 extend integrally from respective ones of the span ribs 34. And, the several slant ribs 36 extend obliquely to the several span ribs 34 and are substantially parallel to each other. In this arrangement, the centrifugal load carrying capability of the airfoil 12 is interrupted longitudinally by the slant ribs 36, but by obliquely tilting the slant ribs 36 in the radial direction a portion of the interrupted load carrying capability is retained.

The several span ribs illustrated in FIG. 1 preferably include a first span rib 34a disposed adjacent the airfoil leading edge 20 and extends longitudinally from at least the airfoil root 26 and terminates adjacent the airfoil tip 28. The top of the first span rib 34a is spaced just below the tip 28 to define the first flow turn of the first circuit 38a. The first span rib 34a extends to the bottom of the dovetail 14 in a continuous member to provide a continuous centrifugal load carrying capability into the dovetail 14.

A second span rib 34b is disposed adjacent the trailing edge 22 and extends longitudinally from the tip 28 and terminates adjacent the root 30. The second span rib 34b is continuous from the airfoil tip 28 to the thicker airfoil root 26 for carrying centrifugal loads thereto.

Correspondingly, a first or upper slant rib 36a extends integrally from the first span rib 34a below its outer tip, and extends toward the trailing edge 22. A second or lower slant rib 36b extends from the second span rib 34b toward the leading edge 20 and is chordally spaced from the first span rib 34a to define therebetween a portion of the serpentine circuit.

In the exemplary embodiment illustrated in FIG. 1, a middle or third span rib 34c is disposed chordally between the first and second span ribs 34a,b and cooperates with the first and second slant ribs 36a,b to define respective portions of the several serpentine circuits 38. The middle span rib 34c extends continuously upwardly from the bottom of the dovetail 14 to the root 26 and terminates at about mid-span below the upper slant rib 36a. The lower portions of the first and middle span ribs 34a,c define respective portions of the inlet channels 40a–c inside the dovetail 14.

In the exemplary embodiment illustrated in FIG. 1, the two slant ribs 36a,b cooperate solely with various ones of the span ribs 34 to define three independent and multi-tier serpentine circuits 38a–c all being fed from respective inlet channels 40a–c inside the dovetail 14. Each inlet channel therefore provides fresh cooling air directly to the separate serpentine circuit for improving cooling effectiveness at each of the part-span regions of the airfoil covered by the respective serpentine circuits 38. Additional, middle ones of the span ribs 34 are bifurcated by the slant ribs 36, while some of the middle span ribs are integral with the slant ribs 36.

In this arrangement, centrifugal loads are carried by the several span ribs 34 and airfoil sidewalls 16,18 radially downwardly to the airfoil root 14. Where some of the span ribs 34 are bifurcated by the slant ribs 36, the centrifugal loads are diverted around the span rib interruptions and to the bridging sidewalls 16,18. The centrifugal loads are carried also by the slant ribs 36 in the longitudinal direction due to their longitudinal tilt for additionally bridging the span rib interruptions.

In the preferred embodiment illustrated in FIG. 1, the first slant rib 36a is integrally joined at both its opposite axial ends to corresponding ones of the span ribs 34 for providing a continuous loadpath from the airfoil tip 28 to the bottom of the dovetail 14. Similarly, the second slant rib 36b is integrally joined at its opposite axial ends to the second and third span ribs 34b,c in another continuous loadpath between the airfoil tip 28 and the dovetail 14. The several middle span ribs 34 carry respective portions of centrifugal load through the sidewalls 16,18 to bridge the span interruptions and in turn carry the centrifugal load through the respective slant ribs 36 and into the integral first and third span ribs 34a,c to the dovetail 14.

Accordingly, the slant ribs 36 cooperate with the airfoil sidewalls 16,18 and the several span ribs 34 to improve the centrifugal load carrying capability of the airfoil 12 when configured in a multi-tier serpentine circuit arrangement. The slant ribs 36 also increase the torsional stiffness of the airfoil 12 for restraining torsional vibration thereof.

In the exemplary embodiment illustrated in FIG. 1, the span ribs 34 cooperate with the first slant rib 36a to define a five-pass first serpentine circuit 38a as the outermost tier circuit. The second slant rib 36b cooperates with respective ones of the span ribs 34 to define another five-pass serpentine circuit 38b as the radially innermost tier circuit. And, the first and second slant ribs 36a,b cooperate with respective ones of the span ribs 34 to define yet another five-pass serpentine circuit 38c as a middle tier circuit. The outer tier circuit 38a is disposed in most part longitudinally above the middle tier circuit 38c, which in turn is disposed in most part longitudinally above the inner tier circuit 38b.

Each of the separate five-pass circuits includes four respective 180° reverse turns or bends through which the cooling air 42 changes direction with significant turbulence and improved cooling effectiveness. The outer ends of the first, third, and fourth span ribs 34a,c,d cooperate with the tip 28 and first and second slant ribs 36a,b to define the respective first turns thereof. Twelve reverse turns are therefore defined by the three separate serpentine circuits 38 which is considerably more than the number of reverse turns possible in a conventional serpentine circuit without multiple tiers.

The enhanced cooling effectiveness of the multi-tier serpentine circuits 38 is now available with improved strength of the airfoil 12 itself due to the slanted ribs 36. The cooling air 42 may be discharged from each of the serpentine circuits 38 through conventional film cooling holes 44a extending through either or both sidewalls 16,18, or may be discharged through conventional trailing edge cooling holes 44b, or may be discharged through conventional tip cooling holes 44c.

In the FIG. 1 embodiment, the upper serpentine circuit 38a cooperates with a conventional impingement cooling circuit which feeds the film cooling holes at the leading edge of the airfoil. The lower circuit 38b cooperates with a conventional trailing edge cooling circuit which feeds the trailing edge cooling holes. If desired, a refresher hole may be added at the end of the lower circuit 38b and the start of the trailing edge circuit to feed additional cooling air to the latter directly from the inlet 40b. And, the circuits may also cooperate with the tip cooling holes 44c found in a conventional tip cap configuration for the airfoil.

The serpentine circuits 38 may also be used in any suitable combination with conventional cooling features for turbine blades, including various forms of internal pins or other turbulators which extend in part into the serpentine circuit from inside the sidewalls 16,18. Due to the increased cooling effectiveness of the multi-turn serpentine circuits 38, these additional cooling enhancing features may be reduced or eliminated depending upon the specific design application.

Figure 6:
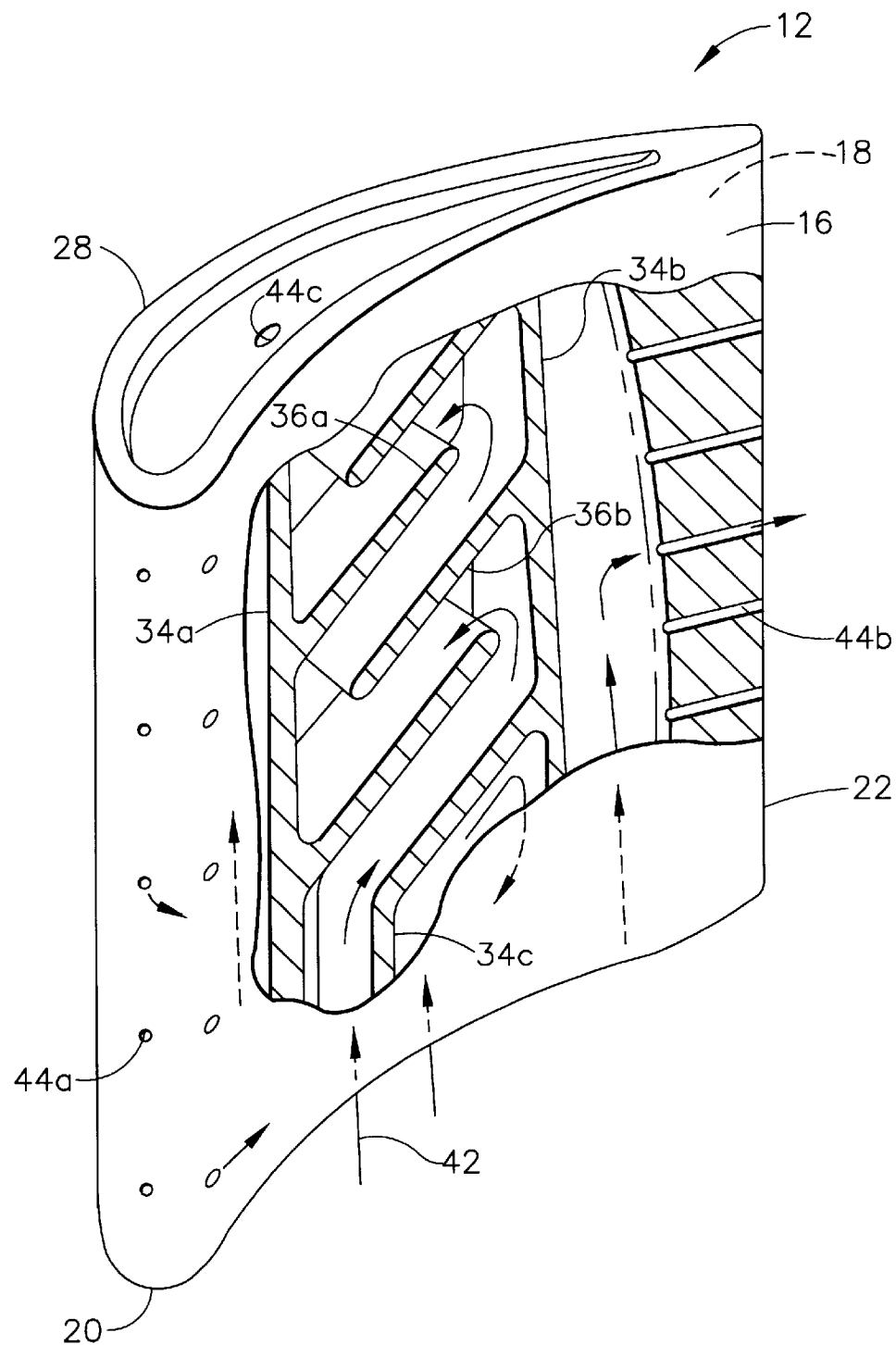
FIG. 6 is an isometric view of the outer span portion of the airfoil illustrated in FIG. 4 shown partly in section.

Illustrated in FIGS. 4–6 is the turbine blade 10 having the span and slant ribs 34,36 configured in a second embodiment of the invention. In this embodiment, a plurality of the first slant ribs 36a extend from the first span rib 34a adjacent the leading edge, and are spaced longitudinally apart and are parallel to each other. The first span rib 34a extends the full longitudinal extent from the bottom of the dovetail 14 to the base of the recessed airfoil tip 28 in a continuous loadpath.

The first slant ribs 36a cooperate with a plurality of the second slant ribs 36b which extend from the second span rib 34b, and are also spaced longitudinally apart and parallel to each other for receiving therebetween respective ones of the first slant ribs 36a to define respective portions of the two serpentine circuits 38a,b.

The first slant ribs 36a shown in FIGS. 4 and 6 slant upwardly from the leading edge side of the airfoil to the trailing edge side of the airfoil between the root and tip thereof at the oblique slant angle A, also in the preferred range of 30° to 60°. Except for the common slant rib 36b formed integrally with the second and third span ribs 34b,c to separate the two circuits, the remaining slant ribs 36a,b are joined solely to one of the span ribs and terminate short of a cooperating span rib to define respective flow turns.

In particular, the first slant ribs 36a terminate forwardly of the second span rib 34b, and the second slant ribs 36b terminate aft of the first span rib 34a to define respective 180° reverse bends or turns in the serpentine circuits. The second slant ribs 36b are preferably substantially parallel with the first slant ribs 36a and therefore also slant upwardly from the leading edge side of the airfoil to the trailing edge side of the airfoil.

In the FIG. 4 embodiment, the top of the third span rib 34c is integrally formed with the forward end of the common slant rib 36b to define an axial partition between the two serpentine circuits 38a,b arranged in most part in multiple-tier longitudinal arrangement. The fourth span rib 34d includes additional ones of the slant ribs which cooperate with additional slant ribs at the lower end of the second span rib 34b. An additional slant rib is provided below the airfoil tip 28.

In this way, each of the serpentine circuits 38a,b utilizes respective ones of the slant ribs 36 to define separate five-pass serpentine cooling circuits each with four 180° reverse turns therein. In the FIG. 1 embodiment disclosed above, the airflow 42 is channeled either radially upwardly or radially downwardly without axial component between the respective reverse turns.

In the FIG. 4 embodiment, the airflow 42 is slanted with both axial and radial components between the respective reverse turns. In both embodiments, the multiple reverse turns significantly increase turbulent flow inside the serpentine circuits and the cooling effectiveness thereof. In the FIG. 4 embodiment, the first serpentine circuit 38a channels the airflow 42 radially upwardly from the inlet 40c for discharge through the airfoil tip 28. In contrast, the second serpentine circuit 38b initially carries the airflow 42 from the inlet 40b to the mid-span of the airfoil from which it is channeled radially inwardly back to the airfoil root 26 from which it enters the trailing edge cooling circuit.

Like the FIG. 1 embodiment, the FIG. 4 embodiment includes a common one of the second slant ribs 36b which extends from the second span rib 34b to the middle span rib 34c to define a partition wall separating the independent first and second serpentine circuits 38a,b. And, the outer tier circuit 38a in the FIG. 4 embodiment is also disposed in most part longitudinally above the inner tier circuit 38b for differentially longitudinally cooling the airfoil 12.

Figure 7:
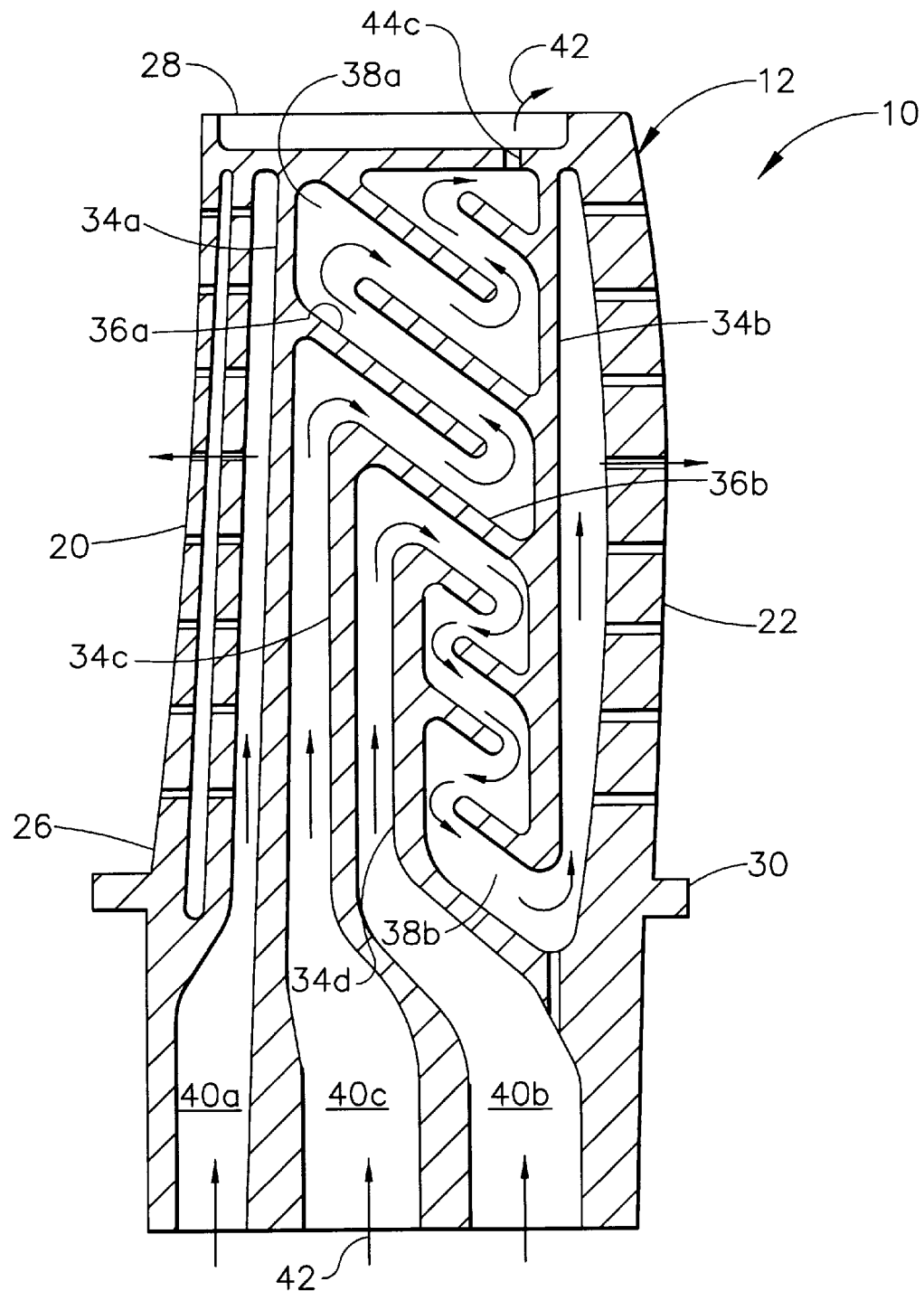
FIG. 7 is an axial sectional view of a turbine blade having an airfoil including slant-tier serpentine cooling circuits in accordance with a third embodiment of the present invention.

FIG. 7 illustrates the turbine blade 10 in a third embodiment of the present invention similar in most part with the FIG. 4 embodiment except that the slant ribs 36a,b slant downwardly from the leading to trailing edges and between the tip 28 and root 26 instead of upwardly as illustrated in FIG. 4. In this way, two five-pass serpentine cooling circuits 38a,b are again defined each having four 180° reverse turns therein.

Like the FIG. 4 embodiment, the upper tier circuit 38a channels the airflow 42 to the airfoil tip 28 which may be discharged through a tip hole 44c. In the FIG. 4 embodiment, the tip hole 44c is disposed adjacent to the first span rib 34a on the leading edge side of the airfoil whereas in the FIG. 7 embodiment, the tip hole 44c is disposed adjacent the second span rib 34b near the trailing edge side of the airfoil. By discharging the airflow 42 close to the airfoil trailing edge 22, the lower external gas pressure in that region will enhance the effectiveness of the cooling air channeled through the upper circuit 38a. The lower circuit 38b is similar in both embodiments illustrated in FIGS. 4 and 7, except for the rib slanting.

Although the invention has been described with respect to the exemplary turbine blade 10 illustrated in the Figures, it may also be used for turbine nozzle vanes which have similar airfoils which can benefit from preferential span-wise cooling thereof for better matching the radial applied temperature distribution from the combustion gases 32.

The slant-tier serpentine cooling arrangements described above provide advantages of preferential span-wise cooling for optimizing the usage of cooling air and to achieve a more desirable metal temperature distribution of the airfoil 12. Although two and three tier serpentine circuits have been disclosed, other configurations may be used depending on the design application and available cooling air pressure. The multi-tier serpentine cooling circuits 38 may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine airfoil comprising:

first and second sidewalls joined together at chordally spaced apart leading and trailing edges and extending longitudinally from a root to a tip;

said sidewalls being spaced apart from each other between said leading and trailing edges and joined together by a plurality of internal ribs defining a serpentine cooling circuit; and said ribs include a span rib extending longitudinally between said root and tip, and a slant rib extending obliquely to said span rib to define respective portions of said serpentine circuit longitudinally above and below said slant rib.

2. An airfoil according to claim 1 further comprising a plurality of said slant ribs spaced longitudinally apart, and extending obliquely to said span rib and substantially parallel to each other.

3. An airfoil according to claim 2 wherein a first one of said slant ribs extends integrally from said span rib.

4. An airfoil according to claim 3 wherein a second one of said slant ribs is spaced from said span rib to define therebetween a portion of said serpentine circuit.

5. An airfoil according to claim 4 further comprising a plurality of said span ribs spaced chordally apart, and said plurality of slant ribs extend integrally from respective ones thereof.

6. An airfoil according to claim 5 wherein:

a first one of said span ribs extends longitudinally from said root and terminates adjacent said tip; and a second one of said span ribs extends longitudinally from said tip and terminates adjacent said root.

7. An airfoil according to claim 6 wherein:

said first span rib is disposed adjacent said leading edge, with said first slant rib extending therefrom toward said trailing edge; and said second span rib is disposed adjacent said trailing edge, with said second slant rib extending therefrom toward said leading edge.

8. An airfoil according to claim 7 further comprising middle ones of said span ribs disposed between said first and second span ribs cooperating with said first and second slant ribs to define respective portions of said serpentine circuit.

9. An airfoil according to claim 8 wherein some of said middle span ribs are bifurcated by said slant ribs, and some are integral therewith.

10. An airfoil according to claim 9 wherein said second slant rib extends from said second span rib to a third span rib spaced between said first and second span ribs to define two independent ones of said serpentine circuits.

11. An airfoil according to claim 10 wherein said two serpentine circuits comprise an outer tier circuit disposed in part longitudinally above an inner tier circuit for differentially longitudinally cooling said airfoil.

12. An airfoil according to claim 7 further comprising:
a plurality of said first slant ribs extending from said first span rib, and spaced longitudinally apart; and
a plurality of said second slant ribs extending from said second span rib, and spaced longitudinally apart to receive therebetween respective ones of said first slant ribs to define respective portions of said serpentine circuit.

13. An airfoil according to claim 12 wherein said second slant rib extends from said second span rib to a third span rib spaced between said first and second span ribs to define two independent ones of said serpentine circuits.

14. An airfoil according to claim 13 wherein said two serpentine circuits comprise an outer tier circuit disposed in part longitudinally above an inner tier circuit for differentially longitudinally cooling said airfoil.

15. An airfoil according to claim 12 wherein said first and second slant ribs slant upwardly from said leading edge to said trailing edge between said root and tip.

16. An airfoil according to claim 12 wherein said first and second slant ribs slant downwardly from said leading edge to said trailing edge between said tip and root.

17. A turbine airfoil comprising:
first and second sidewalls joined together at chordally spaced apart leading and trailing edges and extending longitudinally from a root to a tip;
said sidewalls being spaced apart from each other between said leading and trailing edges and joined together by a plurality of internal ribs defining a serpentine cooling circuit; and
said ribs include a span rib extending longitudinally between said root and tip, and a plurality of slant ribs extending obliquely to said span rib to define respective portions of said serpentine circuit longitudinally between said slant ribs.

18. An airfoil according to claim 17 further comprising first and second ones of said span rib spaced chordally apart, and said slant ribs extend integrally from respective ones thereof.

19. An airfoil according to claim 18 further comprising middle ones of said span ribs disposed between said first and second span ribs and cooperating with said slant ribs to define respective portions of said serpentine circuit.

20. An airfoil according to claim 19 wherein some of said middle span ribs are bifurcated by said slant ribs, and some are integral therewith.

* * * * *